(12) United States Patent
Roguski et al.

(10) Patent No.: US 10,281,355 B2
(45) Date of Patent: May 7, 2019

(54) METHOD AND SYSTEM FOR THE OPTICAL DETERMINATION OF CORRECTION PLANES IN ROTATING ELEMENTS

(71) Applicant: UNIT S.C. Wieslaw Roguski, Jan Tworek, Zaborow (PL)

(72) Inventors: Wieslaw Albin Roguski, Lomianki (PL); Wojciech Wieslaw Roguski, Lomianki (PL); Jan Tworek, Warsaw (PL)

(73) Assignee: UNIT S.C. WIESLAW ROGUSKI, JAN TWOREK, Warsaw (PL)

( * ) Notice: Subject to any disclaimer, the term of this patent is extended or adjusted under 35 U.S.C. 154(b) by 279 days.

(21) Appl. No.: 15/242,957

(22) Filed: Aug. 22, 2016

(65) Prior Publication Data

US 2017/0059440 A1    Mar. 2, 2017

(51) Int. Cl.
*G01M 1/28* (2006.01)
*G01M 1/16* (2006.01)
(Continued)

(52) U.S. Cl.
CPC .............. *G01M 1/16* (2013.01); *G01M 1/225* (2013.01); *G01M 1/28* (2013.01); *G01M 11/081* (2013.01); *H04N 7/181* (2013.01)

(58) Field of Classification Search
CPC ...................................................... G01M 1/16
(Continued)

(56) References Cited

U.S. PATENT DOCUMENTS 5,827,964 A    10/1998  Douine et al.
6,484,574 B1   11/2002  Douglas et al.
(Continued)

FOREIGN PATENT DOCUMENTS

EP    0724144     7/1996
EP    1398611     3/2004
WO    98/10261    3/1998

OTHER PUBLICATIONS

EP Search Report for EP16185127, completed Jan. 17, 2017.
PPO Search Report for P.413757, completed Sep. 5, 2016.

*Primary Examiner* — Walter L Lindsay, Jr.
*Assistant Examiner* — Philipmarcus T Fadul
(74) *Attorney, Agent, or Firm* — Barnes & Thornburg LLP

(57) ABSTRACT

The subject matter of the present invention relates to a system for the optical determination of correction planes in rotating elements, used in the process of balancing, in particular in diagnostic devices equipped with a system which has at least one video camera (K), at least one line projector (RL), a monitor screen (M) and a computer (P) which controls individual component elements of the system, wherein the video camera (K) cooperates with the line projector (RL) while projecting a view of the rotating element (EW) on the monitor screen (M) together with an image of a line (L) projected by means of the line projector (RL).

The subject matter of the present invention also relates a method for determining correction planes which consists in that an area of measurement space is defined on the basis of a virtual rotating element (EW') before placing a rotating element (EW) on the shaft of a diagnostic device (PM) onto which line (L) is projected by means of line projector (RL), and subsequently a view of the rotating element (EW) is transmitted by means of the video camera (K) to the monitor screen (M) together with an image of the projected line (L), and thus the run of the line is obtained which maps a change in the value of the radius $r_n$ from the axis of the shaft of the diagnostic device (PM) and the value of distance $D_n$ of the rotating element (EW) from the diagnostic device (PM) in the defined area of measurement space.

6 Claims, 6 Drawing Sheets

(51) Int. Cl.
*G01M 1/22* (2006.01)
*G01M 11/08* (2006.01)
*H04N 7/18* (2006.01)

(58) Field of Classification Search
USPC .......................................................... 73/462
See application file for complete search history.

(56) References Cited

U.S. PATENT DOCUMENTS

| | | |
|---|---|---|
| 8,113,049 B2 | 2/2012 | Corghi |
| 2006/0042380 A1 | 3/2006 | Douglas et al. |
| 2007/0175275 A1 | 8/2007 | Carpenter et al. |
| 2010/0005883 A1* | 1/2010 | Corghi ............... G01B 11/2522 73/470 |
| 2015/0042787 A1 | 2/2015 | Douglas et al. |

\* cited by examiner

METHOD AND SYSTEM FOR THE OPTICAL DETERMINATION OF CORRECTION PLANES IN ROTATING ELEMENTS

FIELD OF THE INVENTION

The subject matter of the invention relates to a method and system for the optical determination of correction planes in rotating elements, used in the process of balancing, in particular in diagnostic devices, and especially in vehicle wheel balancers.

BACKGROUND OF THE INVENTION

We do not always realize that in our environment there are numerous mechanical devices whose component elements require balancing.

Balancing, in simple terms, consists in determining the size and location of a correction weight compensating for the magnitude of the existing imbalance. Fixing a correction weight on a rotating element reduces residual imbalance to an allowable value.

A perfectly balanced object remains in balance which means that it does not tilt in any direction. Imbalance, on the other hand, means a displacement of the centre of mass of an object from the axis of its rotation, which gives rise to centrifugal force during rotation of the object, which generates vibrations.

The operation of every rotating element is specific and there may be various reasons for the occurrence of imbalance. In many cases, correct balancing of rotating elements has an influence on their proper operation. That is why persons responsible for the supervision or construction of various rotating parts should be equipped with relevant measurement devices comprising relevant measurement systems which will make it possible to quickly eliminate dangerous vibrations and prevent the occurrence of failure and further consequences resulting therefrom.

DESCRIPTION OF PRIOR ART

Considering the above-described problem, in order to prevent damage of rotating elements caused by vibrations resulting from improper or imprecise balancing thereof, and at the same time improve the accuracy and time necessary to determine correction planes, in particular in diagnostic devices, and especially in vehicle wheel balancers, a method and system for the optical determination of correction planes in rotating elements has been provided.

In the state of the art there are known solutions which relate to the determination of correction planes i.e. to the determination of parameters of a rotating element, e.g. a vehicle wheel, which in fact means determining the place for fixing weights. Said solutions consist in measuring the distance from a support to a first correction plane, measuring the spacing between the first and second correction planes, and between both diameters on which the imbalance of rotating element will be corrected. Basically, this process may be carried out by manual measurement, semi-automatic measurement (with the use of a lever provided with sensors which indicates points defining a correction plane), and automatic measurement.

In the state of the art there are also known other methods and systems, in particular machines for vehicle wheel balancing provided with such systems as described in the international application WO 2008/032343 A1 titled "Method and a machine for balancing vehicle wheels" which describes a method using a rangefinder, i.e. an electronic system for measuring distance. A laser sensor sends a light beam and a detector placed in the sensor determines the distance using a reflected wave. The sensor moving along the examined object, which is a hub in this case, performs n measurements and obtains a set of points located at different distances from the sensor. After processing, averaging and analysing the measurements by means of an electronic calculator a set of points is obtained which maps the shape of a rim. On this basis geometrical dimensions of a rotating element may be determined.

However, such solution compared with the claimed solution according to the present invention requires the use of measurement devices, which raises the costs of such solution and prolongs the whole process of determining correction planes.

There is also known the European patent EP 2 020 594 B1 titled "Method of and apparatus for determining geometrical dimensions of a vehicle wheel" which describes a method and apparatus for determining geometrical dimensions of a vehicle wheel and whose essence includes video cameras for determining relevant magnitudes inside a rotating element, which is a rim of a vehicle wheel in this case. A video camera operates on the basis of a source of light in the form of planar beam and a detector of the light reflected off a vehicle wheel surface. Having analysed information received from the detector by the one-point triangulation method, the analysing system can determine the necessary measurement parameters of correction planes.

The said solution, as compared with the claimed solution according to the present invention, requires both one-point triangulation and the analysis of light reflected off the examined object, which also, as in the case of the above described state of the art, generates additional costs and prolongs the whole process of measuring correction planes.

American patent application No. US 2013/0128281 A1 titled: "Method for detecting the shape and/or dimensions of a wheel on vehicle repair workshop machines or the like", just as the above discussed European patent EP 2 020 594 B1, discloses a method for detecting the shape and/or dimensions of a vehicle wheel, in particular for detecting the inner dimension of the vehicle wheel rim, and thus the location of a balancing plane in order to calculate the mass of weights. The said method processes an image by taking a two-dimensional photograph (picture) of a line which photograph is subsequently analysed. Subsequently, such obtained image is processed in order to detect the place for imbalance correction.

There is also known U.S. Pat. No. 7,355,687 B2 titled "Method and apparatus for vehicle service system with imaging components" which presents a vehicle wheel balancing procedure that consists in acquiring by means of sensors, of a two-dimensional array of pixels which maps a projection of a three-dimensional area of the surface of a vehicle wheel, usually the inner surface of the rim, and subsequently the vehicle wheel rim profile is identified in such projected image of the surface area with the use of a central processing unit configured to utilize distance measurements.

The above-described prior art solutions and, more broadly, solutions related to the determination of correction planes used in the process of balancing, in particular in diagnostic devices, and especially in vehicle wheel balancers are based on the analysis of shapes of the examined rotating elements. It only after the analysis of shape has been carried out that parameters necessary in the process of balancing the rotating elements, such as vehicle wheels, are determined. As a result, such solutions significantly prolong the entire process of determining correction planes, which in consequence generates higher costs compared to the solution claimed according to the present invention.

It is thus necessary to emphasize the fact that the claimed solution according to the present invention does not use the analysis of shape of the examined rotating elements at any stage of determining correction planes. Importantly, in the case of the claimed solution we are not interested in the dimensions of a rotating element or its size.

SUMMARY OF THE INVENTION

The purpose of the present invention is to work out a new solution in the form of a method and system of determining correction planes in rotating elements, which method and system will be based on a defined area of measurement space which area of measurement space will define a set of points assigned to specific pixels on the monitor screen.

The area for determining correction planes relevant for the operator will be defined in such a manner that a specific pixel of the monitor screen or another element composed of pixels will be assigned to points in the area of measurement space. The operator, i.e. a person who operates the device, when indicating a specific pixel number on the monitor screen will automatically indicate a point in the area of measurement space, which will simultaneously translate into a specific value of radius and distance.

In order to achieve the above purposes in accordance with one aspect of the present invention, the present invention provides a method for the optical determination of correction planes in a rotating element used in the process of balancing, in particular in diagnostic devices equipped with a system that has at least one video camera, at least one line projector, a monitor screen and a computer, by means of which these component elements of the system are controlled, the method consisting in that a rotating element is placed on the shaft of a diagnostic device in such a manner that the rotating element is perpendicular to the axis of the shaft of a diagnostic device, characterized in that, prior to placing the rotating element on the shaft of the diagnostic device, an area of measurement space is determined in such a manner that pre-determined pixels $P_n$ of the monitor screen having coordinates $x_n$ and $y_n$ are assigned to a set of points in the area of measurement space, which pixels are then assigned pre-determined values of radiuses $r_n$ from the axis of the shaft of the diagnostic device and values of the distance $D_n$ of a line projected each time by the line projector on a virtual rotating element from the diagnostic device, and in such determined area of measurement space the rotating element is placed on the shaft of the diagnostic device onto which a line is projected by the line projector, and subsequently the view of the rotating element is transmitted by means of the video camera to the monitor screen together with the image of the projected line, and thus the run of the line is obtained which maps a change in the value of radius $r_n$ from the axis of the shaft of the diagnostic device and the value of distance $D_n$ of the rotating element from the diagnostic device in the defined area of measurement space, and subsequently a specific pixel $P_n$ having coordinates $x_n$ and $y_n$ is indicated on the monitor screen, which corresponds to the value of radius $r_n$ from the axis of the shaft of the diagnostic device and the value of distance $D_n$ of the rotating element from the diagnostic device, which values are used to determine correction planes of the rotating element.

Preferably, a determined area of measurement space is stored in the computer memory of the diagnostic device or on any other data carrier.

Preferably, a determined area of measurement space is defined by the following relation: $P_n(x_n, y_n) = f(r_n, D_n)$, wherein $P_n$ is a pixel number in the matrix of the monitor screen having coordinates $x_n$ and $y_n$, and f is a function of a projected line on a virtual rotating element or the rotating element having coordinates $r_n$ and $D_n$, wherein $r_n$ is a radius from the axis of the shaft of the diagnostic device, and $D_n$ is a distance from the diagnostic device.

Preferably, the relation $P_n(x_n, y_n) = f(r_n, D_n)$ is formulated in the form of a table or a mathematical function.

According to another aspect of the present invention, the present invention provides a system for the optical determination of correction planes in a rotating element, the system being used in the balancing process, in particular used in diagnostic devices, which system has at least one video camera, at least one line projector, a monitor screen and a computer which controls individual component elements of the system, characterized in that the video camera cooperates with the line projector while projecting a view of the rotating element on the monitor screen together with an image of a line projected by means of the line projector on said rotating element based on such location of the video camera and the line projector that the rotating element is visible, after previously defining the area of measurement space based on a virtual rotating element.

Preferably, the location of the video camera and the line projector is fixed during the whole balancing process.

Preferably, the rotating element (EW) is an element of different sizes.

The solution provided according to the above-proposed aspects ensures an adequate method and system for determining correction planes in rotating elements which consists inter alia in a faster input of given parameters as well as their accuracy. The average data input time in machines and devices known in the state of the art is from several to several tens of seconds, which is a significant amount of time with the measurement cycle being 5-10 seconds. The estimated time in the solution described herein has been reduced to about 1-2 seconds.

Additionally, the system for the optical determination of correction planes in rotating elements according to the invention is more universal compared to the known solutions of the prior art; it may be used in many different branches of industry. The proposed method and system according to the invention may be used as the main functional element, for example, in diagnostic devices, and in particular in vehicle wheel balancers.

BRIEF DESCRIPTION OF DRAWINGS

The subject matter of the invention is presented in an example embodiment in relation to the enclosed figures wherein.

DETAILED DESCRIPTION OF THE INVENTION

The subject matter of the invention is described in detail below with reference to the attached figures and an embodiment. The present invention is not limited only to the detailed embodiment described herein.

Figure 1:
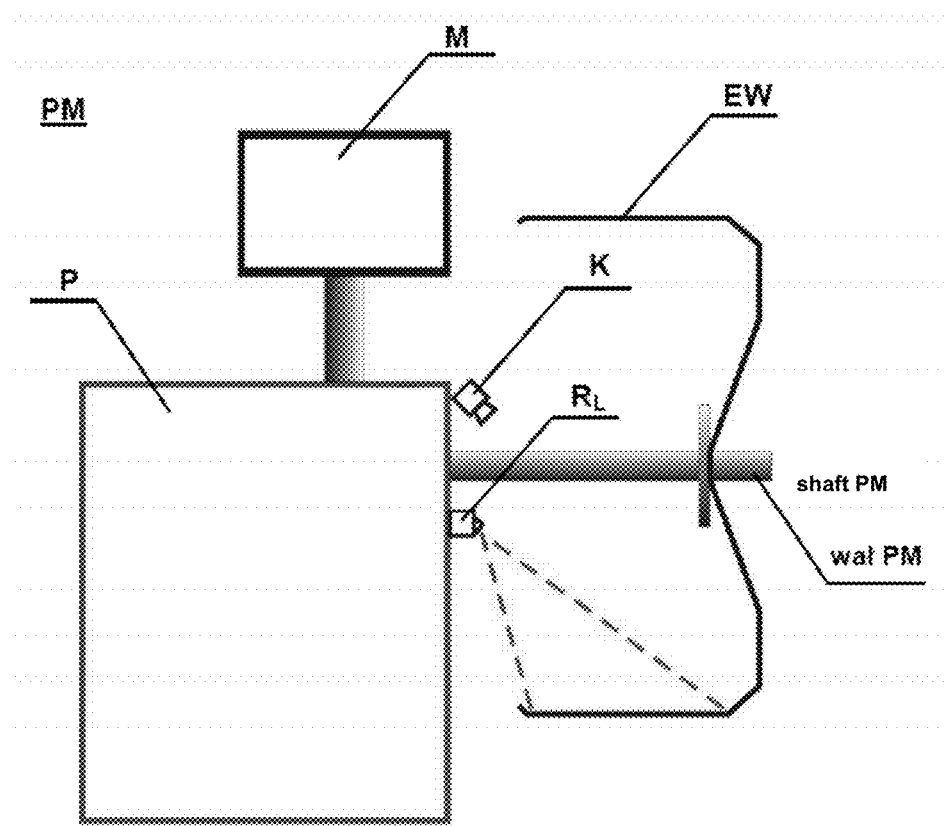
FIG. 1 shows a simplified example of a system for the optical determination of correction planes in a rotating element according to the invention.

In the presented embodiment, FIG. 1 illustrates a system for the optical determination of correction planes with respect to a rotating element (EW), which rotating element (EW) in the embodiment is a rim of different sizes of a vehicle wheel. The said system for the optical determination of parameters of correction planes is composed of a video camera (K), a line projector (RL) located in such a way that the rotating element (EW) is visible, a monitor screen (M), and a computer (P) which controls individual component elements of the system. The entire system has been defined as a functional element of a diagnostic device (PM) in the form of a balancer.

Figure 2A:
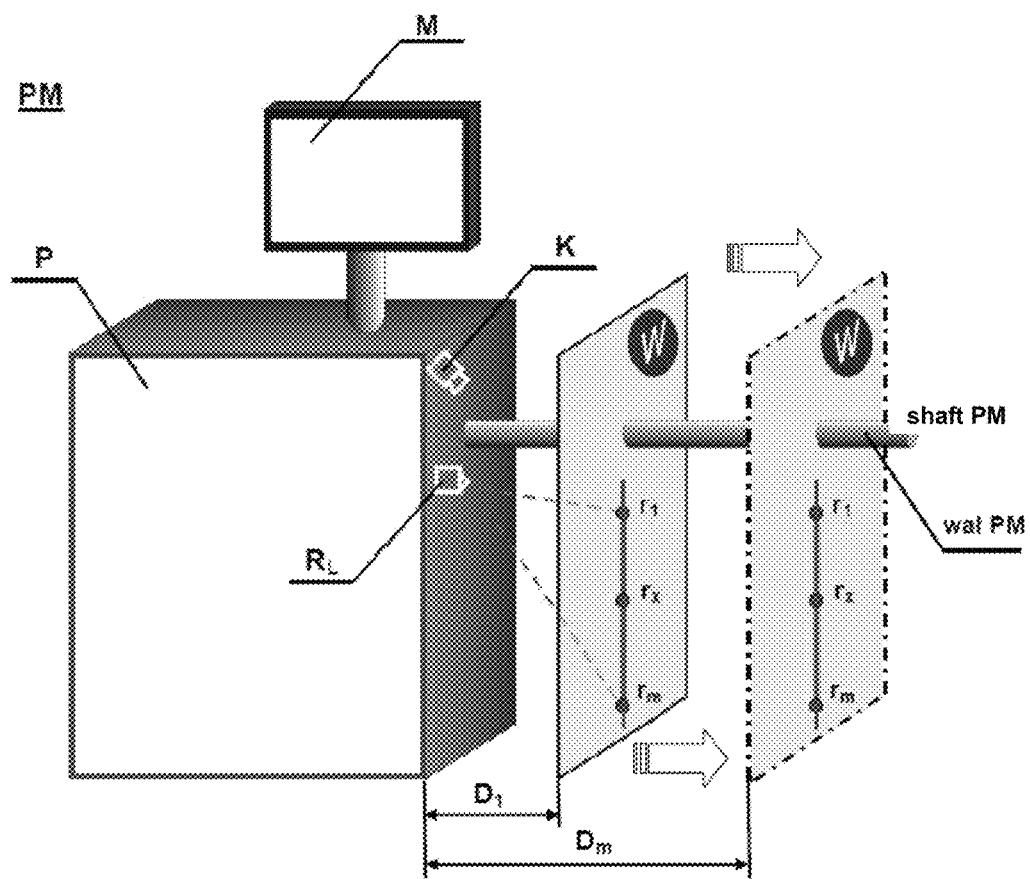
FIG. 2A shows a simplified method for determining a defined area of measurement space for a virtual rotating element used in the method and system for the optical determination of correction planes in a rotating element.

To provide a better view of the essence of the invention of FIG. 1, FIG. 2A presents a simplified scheme of a method of defining an area of a measurement space. The defined area of the measurement space is an area which is determined by a set of points assigned to specific pixels on the monitor screen (M). The essential and key feature of the claimed solution according to the invention consists in that the said area of measurement space is determined before placing the rotating element (EW), which is subsequently subjected to the balancing process, on the shaft of a diagnostic device (PM).

In order to define the above-mentioned area of measurement space, a virtual rotating element (EW') (in the embodiment it is plane (W)) is imposed on the shaft of a diagnostic device (PM) (in the embodiment it is the shaft of the balancer). The said plane (W) is placed in such a way that it is perpendicular to the axis of the shaft of the diagnostic device (PM) and is located at a distance $D_1$, i.e. a minimum distance from the diagnostic device (PM), which is 10 mm in this case.

Figure 2B:
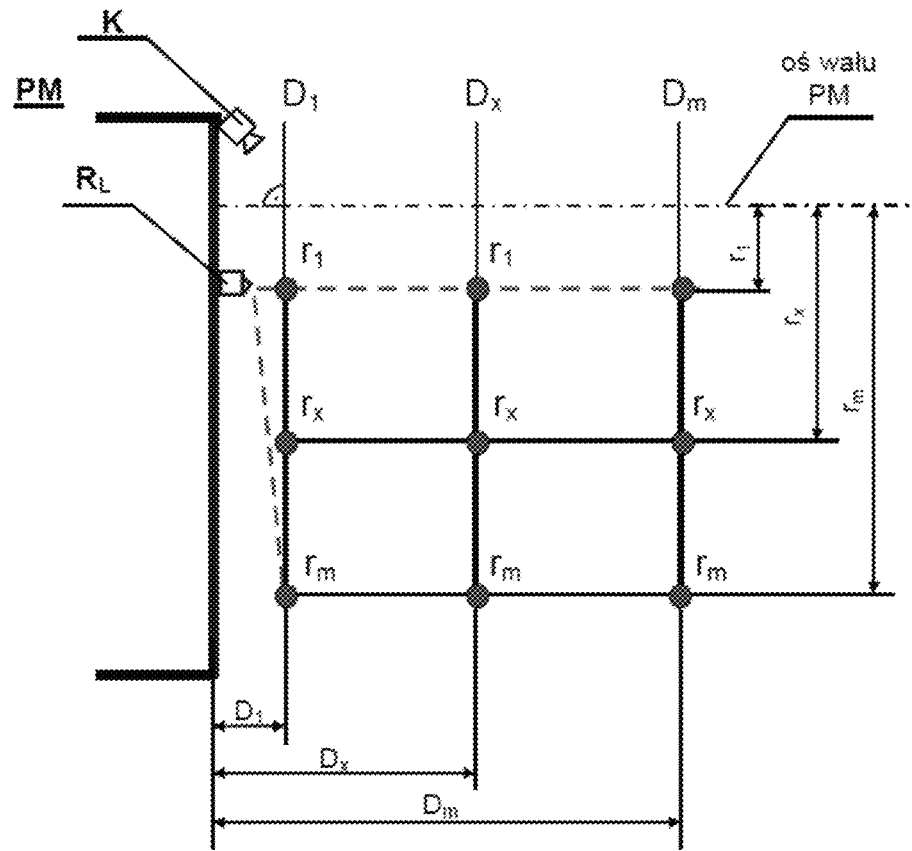
FIG. 2B shows a defined real area of measurement space according to the method and system for the optical determination of correction planes in a rotating element.
Figure 2C:
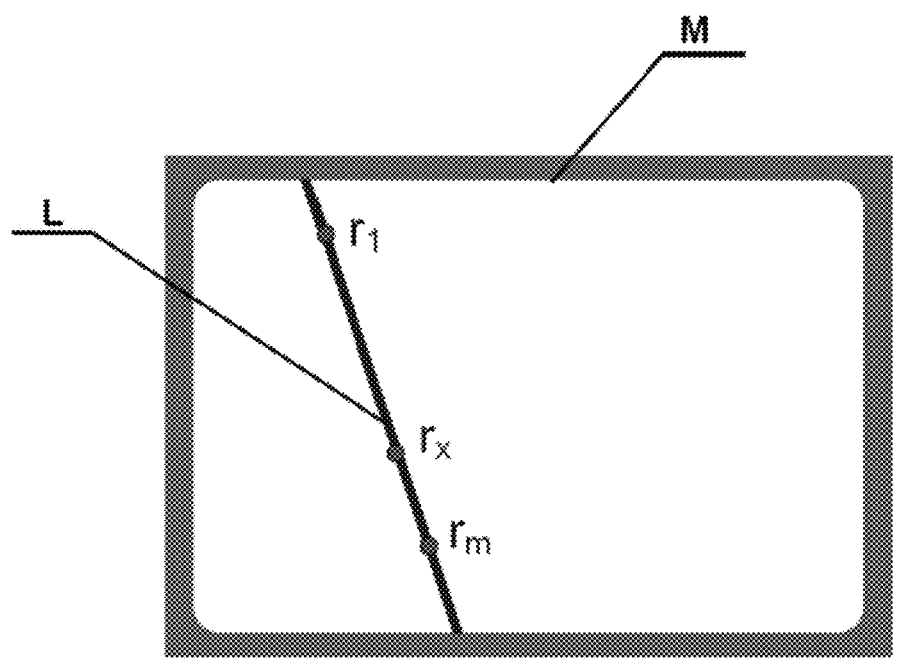
FIG. 2C shows an image of a line on a monitor screen based on a defined area of measurement space of FIG. 2B according to the invention.

The process of determining an area of measurement space consists in that a line is projected from a line projector (RL) onto said plane (W) depicted in FIG. 2A in order to obtain an image of the line, which will be marked as line (L) for the defined area of measurement space. The image of this line is sent by a video camera (K), together with a view of plane (W), to a monitor screen (M). To provide a better picture of the aforesaid, said view has been shown in FIG. 2C as view on the monitor screen (M). In this case, the obtained image of the line (L) is a straight line having an inclination dependent on the position of the video camera (K) and the line projector (RL) relative to the axis of the shaft of the diagnostic device (PM).

The above-mentioned image of the line (L) is displayed on the monitor screen (M) based on specific pixel values $P_n(x_n, y_n)$ corresponding to different values of radiuses $r_n$ relative to the axis of the shaft of the diagnostic device (PM). This is performed in the following way: a minimum value of radius $r_1$ relative to the axis of the shaft of a diagnostic device (PM), which is 100 mm in the present case, is marked on plane (W) and subsequently the assigned pixel value $P_1(x_1, y_1)$ for that radius $r_1$ is read on the monitor screen. This operation is repeated for subsequent radiuses $r_n$, including a random value of radius $r_x$, which is 280 mm in the present case, and finally for the maximum radius value $r_m$, which is 500 mm in the present case. In the case of the maximum radius value $r_m$ the assigned pixel value will thus be $P_m(x_m, y_m)$. Therefore, the remaining points on the plane (W) between $r_1$ and $r_m$ correspond to different radius values $r_n$ and different pixel values $P_n(x_n, y_n)$ on the monitor screen (M).

Figure 3:
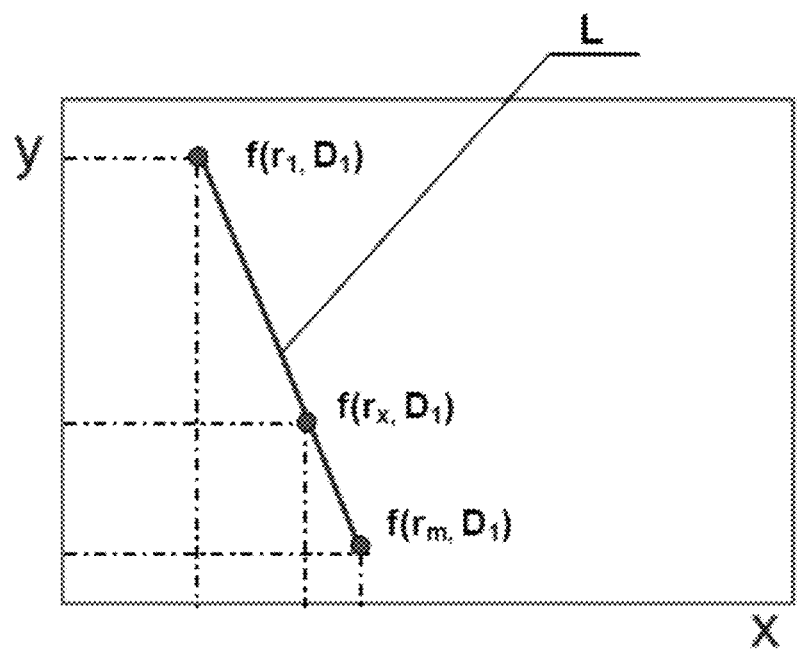
FIG. 3 shows an exemplary image presenting a straight line limited to relevant scope of radiuses representing a change, in the area of measurement space, of a radius value at a distance according to the embodiment.

The above-mentioned pixel values $P_n(x_n, y_n)$ are subsequently stored in the computer memory (P) of the diagnostic device (PM), keeping in mind that they are related to distance $D_1$, i.e. a minimum distance from the diagnostic device (PM) and they are determined according to the function:

$$x_1 = a_1 y_1 + b_1$$

wherein $x_1$, $y_1$ represent a pixel number $P_1(x_1, y_1)$ on the matrix of the monitor screen (M) as presented in FIG. 3. This figure presents a straight line with three characteristic magnitudes: magnitude $r_1$ which is a minimum radius value, magnitude $r_x$ which is a random radius value, and magnitude $r_m$ which is a maximum radius value.

The operation as described above for plane (W) at distance $D_1$ is then performed each time for subsequent distance $D_n$ in relation to distance $D_1$. This operation involves displacing the above-mentioned plane (W) along the axis of the shaft of the diagnostic device (PM) up to distance $D_m$, i.e. a maximum distance from the diagnostic device (PM), which is 500 mm in the present case, through distance $D_x$ which is a random distance from the diagnostic device (PM) and amounts to 150 mm in the present case, as illustrated more precisely in FIG. 2B.

Figure 4:
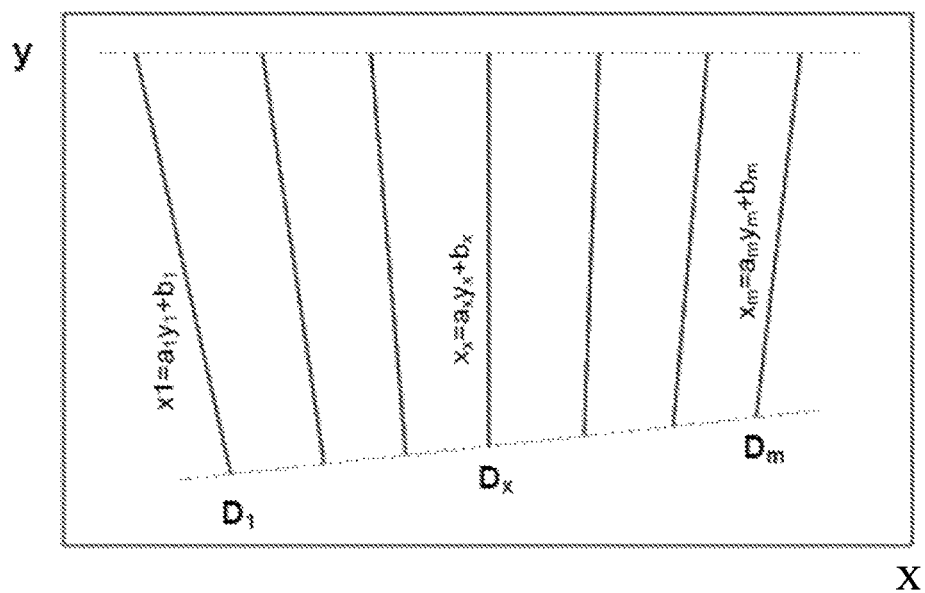
FIG. 4 shows, in the form of a quadrilateral, a set of straight lines of a defined area of measurement space according to the embodiment.

For each individual distance $D_n$, n measurements as defined above are performed, just as for distance $D_1$, and thus a set of straight lines is obtained according to the function:

$$x_n = a_n y_n + b_n$$

which, having been subsequently stored in the computer memory (P) of the diagnostic device (PM), will be lines corresponding to $n^{th}$ distance, that is the distance $D_n$. A set of the straight lines will take a form of a quadrilateral as shown in FIG. 4. Thus, a defined area of measurement space is obtained, which area will define a set of points assigned to specific pixels on the monitor screen (M). The shape of the quadrilateral will be dependent on the location of the video camera (K) and the line projector (RL) relative to the axis of the shaft of the diagnostic device (PM).

On the basis of the above, a similar analysis of an area of measurement space may defined with respect to another virtual rotating element (EW'), for example, a cylinder which, like the above-described plane (W), is imposed on the shaft of a diagnostic device (PM) and subsequently line (L) is projected onto an element the cylinder by means of a line projector (RL). When an image has been created on the monitor screen (M) we will obtain a set of lines:

$$yn = anxn + bn$$

in the case when the line projector (RL) is coincident with the axis of the shaft of the diagnostic device (PM), or a set of square lines:

$$y^2n = anx^2n + bnxn + cn$$

when the line projector (RL) is not coincident with the axis of the shaft of the diagnostic device (PM).

The above-described area of measurement space is defined as an assignment that describes the relation between the value of a radius $r_n$ from the axis of the shaft of the diagnostic device (PM) and the distance $D_n$ of given point in the area of measurement space to a specific pixel $P_n(x_n, y_n)$, wherein $n^{th}$ pixel $P_n$ is defined as coordinates $x_n$ and $y_n$ of matrix of the monitor screen (M); and thus the equation is expressed as follows:

$$P_n(x_n, y_n) = f(r_n, D_n)$$

wherein $P_n$ is a pixel number on the matrix of the monitor screen (M) having coordinates $x_n$ and $y_n$, and f is a function having coordinates $r_n$ and $D_n$ wherein $r_n$ is a radius from the axis of the diagnostic device (PM), and $D_n$ is a distance from the diagnostic device (PM). This relation may be formulated in the form of a table or as a mathematical function.

In such defined area of measurement space a rotating element (EW) is placed which is subjected to balancing by putting the above-mentioned rotating element (EW) (in the embodiment it is a rim of various sizes of vehicle wheel) on the shaft of a diagnostic device (PM). Subsequently, a line marked as (L) is projected from a line projector (RL) onto the rotating element (EW), i.e. the element being balanced, and thus the run of the line is obtained which will represent a change of radius r relative to the axis of the shaft of the diagnostic device (PM) and of the distance D from the diagnostic device (PM). When indicating a specific place on the monitor screen we indicate a specific pixel number $P_n(x_n, y_n)$, which corresponds to a specific value of radius $r_n$ and distance $D_n$ in the defined area of measurement space.

In the case of balancing vehicle wheels of different sizes it is necessary to determine imbalance correction planes. When watching the rotating element (EW) in the form of a vehicle wheel rim on the monitor screen (M), we indicate a point at which we want to fix a correction weight; having found out what is the corresponding pixel number $P_n$ we know the radius $r_n$ and distance $D_n$ at which the correction plane is located. It is worth noting here that the rotating element (EW) in the form of a vehicle wheel rim has a varied shape resulting from the construction thereof. Thus, line (L) projected from a line projector (RL) and obtained on the monitor (M) is a curved line mapping a change in the value of radius r at a distance D in the area of measurement space. Using the above defined assignment:

$$P_n(x_n, y_n) = f(r_n, D_n)$$

the value of radius $r_{x,1}$ and distance $D_{x,1}$ with respect to pixel $P_{x,1}$, and the value of radius $r_{x,2}$ and distance $D_{x,2}$ with respect to pixel $P_{x,2}$ is defined by means of a computer (P). These values unambiguously define correction planes of a rotating element (EW), which, in this case, is a rim of various sizes of vehicle wheel.

The above description of presented embodiment has been provided to enable any person skilled in the art to carry out or use the invention. It is also possible to modify this embodiment in various ways to include all such changes, modifications and variants that fall within the essence and scope of the attached patent claims. The basic principles described herein may thus be applied in other embodiments without extending the scope of the invention. Therefore, the intention of the present invention is not to limit it to the presented embodiment but to make it consistent with the broadest possible scope corresponding to the principles and new features presented herein.

Thus the solution according to the present invention uses the above specified technical means as indicated in FIG. 1 to offer a system for the optical determination of correction planes to be used in the process of balancing, in particular in diagnostic devices, and especially in vehicle wheel balancers. The present system is based on the optical measurement of correction planes with the use of a defined area of measurement space. This system is a component part of the above-described diagnostic devices, in particular vehicle wheel balancers.

The present invention may be used in particular in all applications where there is a need to define points in a geometrical space, specifically correction planes, i.e. in all applications that require balancing of rotating elements in order to avoid vibrations caused by centrifugal force during rotation of an object.

To exemplify, one may mention in particular diagnostic devices, and especially vehicle wheel balancers, in particular for passenger cars, delivery vans and trucks, presented as an embodiment in the description, but also other rotating elements, such as fans, abrasive discs, washing machine drums or hard disk platters in computers.

The invention is thus capable of being used in all applications which require the highest standards of safety, or where there is a need to meet high economic standards (for example, in all applications where unbalanced rotating elements of devices wear out faster or fail more frequently), or finally in all applications that require comfortable operation (i.e. in all applications where unbalanced elements cause noise or vibrations).

The invention claimed is:

1. A method for the optical determination of correction planes in a rotating element (EW) used in the process of balancing, in particular in diagnostic devices equipped with a system that has at least one video camera (K), at least one line projector (RL), a monitor screen (M) and a computer (P) by means of which these component elements of the system are controlled, the method consisting in that a rotating element (EW) is placed on the shaft of a diagnostic device (PM) in such a manner that the rotating element (EW) is perpendicular to the axis of the shaft of a diagnostic device (PM), characterized in that, prior to placing the rotating element (EW) on the shaft of the diagnostic device (PM), an area of measurement space is determined in such a manner that pre-determined pixels $P_n$ of the monitor screen (M) having coordinates $x_n$ and $y_n$ are assigned to a set of points in the area of measurement space, which pixels are then assigned pre-determined values of radiuses $r_n$ from the axis of the shaft of the diagnostic device (PM) and values of the distance $D_n$ of line (L) projected each time by the line projector (RL) on a virtual rotating element (EW') from the diagnostic device (PM), and in such determined area of measurement space the rotating element (EW) is placed on the shaft of the diagnostic device (PM) onto which a line (L) is projected by the line projector (RL), and subsequently the view of the rotating element (EW) is transmitted by means of the video camera (K) to the monitor screen (M) together with the image of the projected line (L), and thus the run of the line is obtained which maps a change in the value of radius $r_n$ from the axis of the shaft of the diagnostic device (PM) and the value of distance $D_n$ of the rotating element (EW) from the diagnostic device (PM) in the defined area of measurement space, and subsequently a specific pixel $P_n$ having coordinates $x_n$ and $y_n$ is indicated on the monitor screen, which corresponds to the value of radius $r_n$ from the axis of the shaft of the diagnostic device (PM) and the value of distance $D_n$ of the rotating element (EW) from the diagnostic device (PM), which values are used to determine correction planes of the rotating element (EW).

2. The method according to claim 1, characterized in that a determined area of measurement space is stored in the computer (P) memory of the diagnostic device (PM) or on any other data carrier.

3. The method according to claim 1 or 2, characterized in that a determined area of measurement space is defined by the following relation: $P_n(x_n, y_n)=f(r_n, D_n)$, wherein $P_n$ is a pixel number in the matrix of the monitor screen having coordinates $x_n$ and $y_n$, and f is a function of a projected line (L) on a virtual rotating element (EW') or the rotating element (EW) having coordinates $r_n$ and $D_n$, wherein $r_n$ is a radius from the axis of the shaft of the diagnostic device (PM) and $D_n$ is a distance from the diagnostic device (PM).

4. A system for the optical determination of correction planes in a rotating element (EW), wherein the system has at least one video camera (K), at least one line projector (RL), a monitor screen (M) and a computer (P) which controls individual component elements of the system, characterized in that the video camera (K) cooperates with the line projector (RL) while projecting a view of the rotating element (EW) on the monitor screen together with an image of a line (L) projected by means of the line projector (RL) on said rotating element (EW), which is positioned on the shaft of a diagnostic device (PM), based on such location of the video camera (K) and the line projector (RL) such that the rotating element (EW) is visible, after previously defining the area of measurement space in such a manner that pre-determined pixels $P_n$ of the monitor screen (M) having coordinates $x_n$ and $y_n$ are assigned to a set of points in the area of measurement space, which pixels are then assigned pre-determined values of radiuses $r_n$ from the axis of the shaft of the diagnostic device (PM) and values of the distance $D_n$ of line (L) projected each time by the line projector (RL) on a virtual rotating element (EW') from the diagnostic device (PM).

5. The system according to claim 4, characterized in that the location of the video camera (K) and the line projector (RL) is fixed.

6. The system according to claim 4, characterized in that the rotating element (EW) is an element of different sizes.

* * * * *